DERBY & WEST.
Railway Car.
No. 49,508. Patented Aug. 22, 1865.
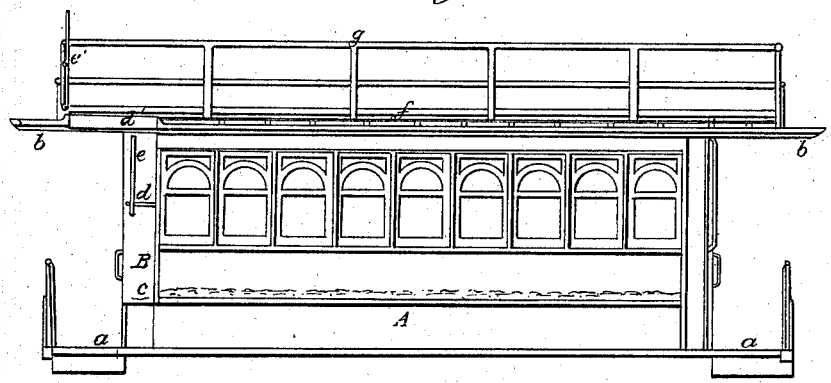
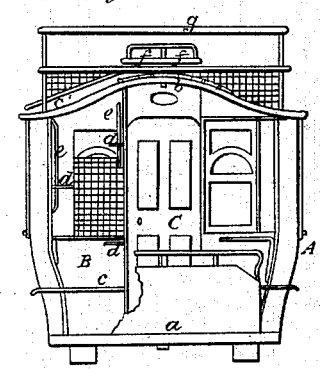
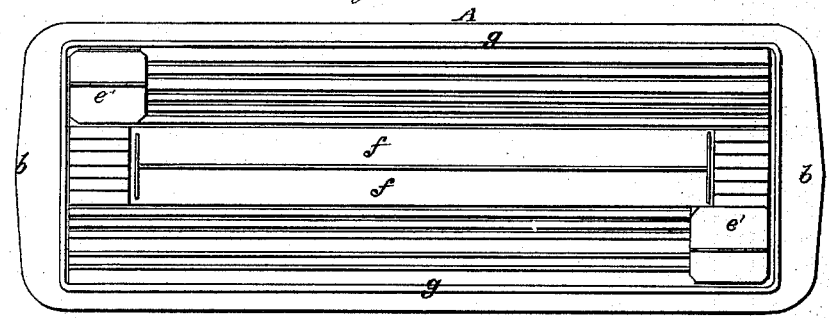
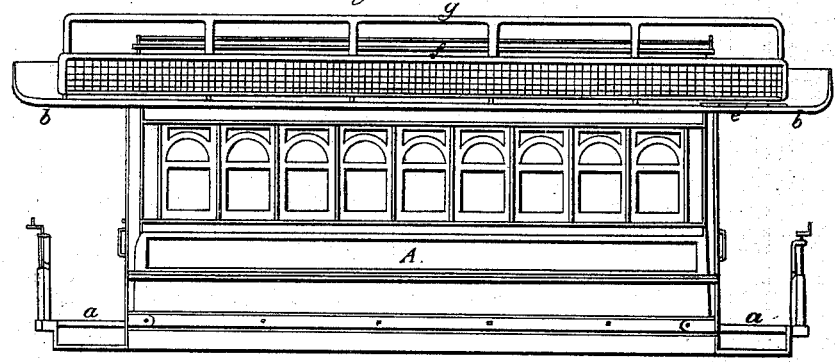
Witnesses:
F. P. Hale Jr.
Frederick Curtis
Inventor:
Elias H. Derby and True West
by their att'y
R. H. Eddy

UNITED STATES PATENT OFFICE.

ELIAS HASKET DERBY, OF BOSTON, AND TRUE WEST, OF ROXBURY, MASS.

IMPROVEMENT IN RAILWAY-CARS.

Specification forming part of Letters Patent No. 49,508, dated August 22, 1865.

*To all whom it may concern:*

Be it known that we, ELIAS HASKET DERBY, of Boston, in the county of Suffolk, and TRUE WEST, of Roxbury, in the county of Norfolk, and State of Massachusetts, have invented a new and useful Improvement in Carriages, and particularly in those for street-railways; and we do hereby declare the same to be fully described in the following specification and represented in the accompanying drawings, of which—

Figure 1 is a top view, Fig. 2 a side elevation, and Fig. 3 an end view, of the body of a street-railway car or carriage provided with our invention. Fig. 4 is a section of the hatchway and the niche or recess at one end of such body.

The purposes of our invention are not only to provide an outside seat at the platform of a car, but a stairway or ready means of ascending from the platform to the roof of the car or of descending from the roof to the platform, as circumstances may require, without any material diminution of the seats within.

In carrying out our invention we make the carriage, or "car," as it is commonly termed, in all respects as usual, except that we form in it at one or at each end of it a vertical recess or niche, which we arrange alongside of the end doorway, and so as to extend downward from an opening or hatchway made in that part of the roof which is over the platform projecting from the end of the car. This niche may terminate at the platform and have a seat arranged across; but we prefer to terminate it above the platform and constitute its bottom or base a seat for a person on the platform to sit upon. The said bottom answers also as a step to aid a person to ascend the roof of the carriage. The hatchway in the roof may be provided with a folding door or hatch for closing it, as occasion may require, and we prefer to have one at each end of the car, so that the door nearest to the horses may be closed. Furthermore, we arrange in the niche or recess, in its opposite parts or corners, a series of steps or small shelves, and also sundry short hand-rails or holders so arranged as to enable a person, by grasping the said rail or holders and placing his feet on the steps or shelves in succession, to mount through the recess and ascend to the roof of the car or descend therefrom, such roof being provided with seats for the accommodation of passengers.

In the drawings, A denotes the carriage-body, of which $a\ a$ are the platforms, and $b$ the parts of the roof which project over the platforms. The niche or recess at the end of the body is represented at B as arranged aside of the door C, and as provided with a seat, $c$, at its base, and also with steps or shelves $d\ d\ d$, and hand-rails or holders $e\ e$, arranged as shown in the drawings. The hatchway in the roof and over the recess B is exhibited at $d'$, its door or-hatch being shown at $e'$. When a car has such addition to it we prefer to fix seats $ff$ along its roof, and also to add to such roof a railing, $g$, to go either wholly or partially around it, as may be deemed advisable.

We would observe that the smaller steps of the niche or recess are arranged in the corners thereof in order not to interfere with a person while occupying the seat at the lower part of the niche. The recess may be about six or eight inches in depth, although we do not confine our invention to such dimensions, the window and the lamp-box being at the rear of the recess and the niche being opposite to the case of the door in case a sliding door be used.

The advantages of a car so made may be stated as follows: It is enabled to carry double, or usually more than double, the number of passengers that a car as ordinarily constructed can without roof-seats, thus causing a great increase of the living or profitable weight transported by it without overtasking the power of the draft-animals. The invention does not interfere with the free use of the platform or the window or lamp-box at the end of the car. Such window and lamp-box we protect by a grating or foraminous plate or a screen of woven wire arranged across them and at the back of the recess.

We claim as our invention—

1. The railway-carriage as constructed with the niche or recess B in either or each of its ends, and with steps $d\ d$ and hand-holders $e\ e$, arranged within or applied to such recess, substantially as and for the purpose described.

2. The combination of the seat $c$ in the recess or at its base with such recess and the series of steps and hand-holders, when applied together and to a railway-carriage substantially as specified.

3. The combination and arrangement of the hatchway, or the same and its hatch or door in the roof, with the niche or recess, its steps, and hand-holders arranged in the body of the carriage, substantially as stated.

ELIAS HASKET DERBY.
   TRUE WEST.

Witnesses:
 R. H. EDDY,
 F. P. HALE, Jr.